US010889507B2

(12) United States Patent
Edwards et al.

(10) Patent No.: US 10,889,507 B2
(45) Date of Patent: Jan. 12, 2021

(54) PROCESS FOR PRODUCING A METAL OXIDE POWDER

(71) Applicant: OXFORD UNIVERSITY INNOVATION LIMITED, Oxford (GB)

(72) Inventors: Peter Edwards, Oxford (GB); Jonathan Dilworth, Oxford (GB); Vladimir Kuznetsov, Oxford (GB); Catherine Hayes, Oxford (GB)

(73) Assignee: OXFORD UNIVERSITY INNOVATION LIMITED, Oxford (GB)

(*) Notice: Subject to any disclaimer, the term of this patent is extended or adjusted under 35 U.S.C. 154(b) by 106 days.

(21) Appl. No.: 16/075,034

(22) PCT Filed: Feb. 6, 2017

(86) PCT No.: PCT/GB2017/050295
§ 371 (c)(1),
(2) Date: Aug. 2, 2018

(87) PCT Pub. No.: WO2017/134469
PCT Pub. Date: Aug. 10, 2017

(65) Prior Publication Data
US 2019/0023583 A1 Jan. 24, 2019

(30) Foreign Application Priority Data
Feb. 5, 2016 (GB) .................................. 1602090.1

(51) Int. Cl.
*C01G 45/02* (2006.01)
*C01G 31/02* (2006.01)
*C01G 39/02* (2006.01)
*C01G 41/02* (2006.01)
*C01B 13/34* (2006.01)
*C01G 17/02* (2006.01)
*C01G 1/02* (2006.01)

(52) U.S. Cl.
CPC .............. *C01G 45/02* (2013.01); *C01B 13/34* (2013.01); *C01G 1/02* (2013.01); *C01G 17/02* (2013.01); *C01G 31/02* (2013.01); *C01G 39/02* (2013.01); *C01G 41/02* (2013.01); *C01P 2002/54* (2013.01); *C01P 2002/72* (2013.01); *C01P 2002/84* (2013.01); *C01P 2004/03* (2013.01)

(58) Field of Classification Search
CPC .......... C01G 45/02; C01G 1/02; C01G 17/02; C01G 41/02; C01G 39/02; C01G 31/02; C01B 13/34; C01P 2004/03; C01P 2002/84; C01P 2002/72; C01P 2002/54
See application file for complete search history.

(56) References Cited

U.S. PATENT DOCUMENTS

| | | | |
|---|---|---|---|
| 3,850,665 A | 11/1974 | Plumat et al. | |
| 4,129,434 A | 12/1978 | Plumat et al. | |
| 4,719,126 A | 1/1988 | Henery | |
| 4,719,127 A | 1/1988 | Greenberg | |
| 4,855,161 A | 8/1989 | Moser et al. | |
| 5,427,763 A | 6/1995 | Lawton et al. | |
| 5,997,956 A * | 12/1999 | Hunt | B22F 9/28 427/446 |
| 6,793,975 B2 * | 9/2004 | Hunt | B22F 9/28 427/446 |
| 2002/0015785 A1 | 2/2002 | Athey et al. | |
| 2004/0202890 A1 | 10/2004 | Kutilek et al. | |

FOREIGN PATENT DOCUMENTS

| | | |
|---|---|---|
| WO | WO 2004/092989 | 10/2004 |
| WO | WO 2017/134470 | 2/2017 |

OTHER PUBLICATIONS

Piccirillo, C. et al. "Synthesis and Functional Properties of Vanadium Oxides: V2O3, VO2, and V2O5 Deposited on Glass by Aerosol-Assisted CVD," Chem. Vap. Deposition 2007, 13, 145-151, 7 pages.
Internatiional Search Report and Written Opinion issued for PCT/GB2017/050295, dated Apr. 18, 2017, 10 pages.
Search Report issued for British Patent Application No. GB 1602090.1, dated Aug. 11, 2016, 4 pages.
International Search Report and Written Opinion issued for PCT/GB2017/050296, dated Apr. 24, 2017, 9 pages.
Search Report issued for British Patent Application No. GB 1602083.6, dated Aug. 11, 2016, 4 pages.

* cited by examiner

Primary Examiner — Anthony J Zimmer
(74) Attorney, Agent, or Firm — Foley & Lardner LLP

(57) ABSTRACT

A process for producing a metal oxide powder comprising: providing a precursor solution or dispersion containing a metal complex; spraying the precursor solution on to a heated substrate in the presence of water, thereby depositing material on the substrate; drying the deposited material; and removing the deposited material from the substrate to produce the metal oxide powder.

17 Claims, 3 Drawing Sheets

PROCESS FOR PRODUCING A METAL OXIDE POWDER

CROSS-REFERENCE TO RELATED APPLICATIONS

The present application is a U.S. National Stage Application claiming the benefit of International Application No. PCT/GB2017/050295, filed on Feb. 6, 2017, which claims priority from Great Britain Patent Application No. 1602090A, filed Feb. 5, 2016, the entire contents of which are incorporated herein by reference in their entirety.

The invention relates to a process for producing a powder, to powders obtainable or obtained by that process, and to various uses of such powders. More particularly, the invention relates to a process for producing a metal oxide powder, to metal oxide powders obtainable or obtained by that process, and to various uses of such metal oxide powders. The metal oxide powder may comprise, or consist essentially of, undoped or doped metal oxide.

Thermochromic materials are characterised by a semiconductor-to-metal transition, which occurs due to a reversible change in the materials' crystalline and/or electronic structure as a function of temperature. Changes in the materials' optical, electrical and magnetic properties occur as a result of the semiconductor-to-metal transition.

Thermochromic materials are of interest because they have several potentially useful applications, including for instance in smart windows, through which light and heat transmittance varies according to the surrounding temperature.

Vanadium (IV) oxide ($VO_2$) is a particularly interesting thermochromic material, because it exhibits a large reversible change in its optical, electrical and magnetic properties caused by a semiconductor-to-metal transition at temperatures around 70° C. The temperature at which the semiconductor-to-metal transition occurs can be modified by doping. For instance, doping $VO_2$ with high-valent transition metals such as niobium, molybdenum or tungsten reduces the temperature at which the semiconductor-to-metal transition occurs. On the other hand, doping $VO_2$ with trivalent cations such as chromium and aluminium increases the temperature at which the semiconductor-to-metal transition occurs.

However, to date, a reliable, cost-effective and energy-efficient process for producing significant quantities of $VO_2$ powder in a pure form (e.g. with a purity of 90% or more) for industrial demands has not been developed. The lack of such a process is holding back the development and commercialisation of products that make use of $VO_2$'s unique properties.

The chemistry of vanadium oxides is one reason why it is difficult to produce significant quantities of $VO_2$ powder in a pure form. Vanadium can have several oxidation states and hence can form several oxides, each with significantly different magnetic and electrical properties. Edwards P., Kuznetsov V., Slocombe D. and Vijayaraghavan R. The Electronic Structure and Properties of Solids. In: Jan Reedijk and Kenneth Poeppelmeier, editors. Comprehensive Inorganic Chemistry II, Vol 4. Oxford: Elsevier; 2013. p. 153-176 discusses the electronic structure and properties of solids, in particular oxides.

$VO_2$ powders have been produced by liquid-feed flame spray reaction processes (pyrolysis). However, the results have generally been unsatisfactory, since the powders produced have not had good purity. Without wishing to be bound by any theory, this could be due to the flame being too hot and the fact that the flame pyrolysis process is run in air. US2006/0165898 discloses efforts to decrease the flame temperature by contacting said flame with a cooling medium.

Hydrothermal routes for producing $VO_2$ powder are also unsatisfactory. The above-atmospheric pressures involved dictate that such processes can be relatively expensive and/or subject to a relatively high risk-element. Furthermore, such hydrothermal routes do not offer a scalable process for producing significant quantities of $VO_2$ powder in a pure form.

Examples of hydrothermal synthesis routes for producing $VO_2$ powders are disclosed in: Ji, S., Zhang, F. & Jin, P., *Solar Energy Materials and Solar Cells* 95 (2011) 3520-3526; Zhou, J. et al, *Physical Chemistry Chemical Physics* 15 (2013) 7505-7511; Lv, W. et al, *Ceramics International* 40 (2014) 12661-12668; and Zhang, C. et al, *International Journal of Electrochemical Science* 10 (2015), 6014-6019. Ji, S., Zhang, F. & Jin, P., *Journal of Physics and Chemistry of Solids* 73 (2012) 762-769 describes formation mechanisms and crystallographic characteristics of metastable $VO_2$(A) nanofibers hydrothermally synthesised in $V_2O_5$—$H_2C_2O_4$—$H_2O$ system. Ji, S., Zhang, F. & Jin, P., *Journal of Solid State Chemistry* 184 (2011), 2285-2292 describes selective formation of $VO_2$(A) and $VO_2$(R) polymorph by controlling the hydrothermal pressure.

R. Binions et al., J. Mater. Chem., 2007, 17, 4652-4660 describes the preparation of $VO_2$ thin films by atmospheric pressure chemical vapour deposition (APCVD) from vanadyl acetylacetonate and tungsten hexachloride.

B. W. Mwakikunga et al., *Optical Materials* 29 (2007) 481-487 describes the production of sub-micrometre structured $VO_2$ thin films by ultrasonic nebula-spray pyrolysis from the precursor vanadium trichloride in an aqueous solution of 0.085 M ammonium meta-vanadate.

A first aspect of the invention provides a process for producing a metal oxide powder comprising:
  providing a precursor solution or dispersion containing a metal complex;
  spraying the precursor solution on to a heated substrate in the presence of water, thereby depositing material on the substrate;
  drying the deposited material; and
  removing the deposited material from the substrate to produce the metal oxide powder.

The invention provides a spray pyrolytic process for the preparation of doped and undoped metal oxide powders, e.g. vanadium (IV) oxide ($VO_2$) powder.

In an embodiment, the precursor solution may be an aqueous solution. The precursor solution may comprise an aqueous solvent mixture or an aqueous/non-aqueous solvent mixture.

The concentration of the precursor solution may be up to 0.1 M or up to 0.05 M.

One or more phases of the metal oxide may be present in the metal oxide powder.

The metal oxide powder may comprise, or consist essentially of, a metal (IV) oxide powder ($MO_2$, where M is a metal). The metal oxide powder may comprise, or consist essentially of, vanadium (IV) oxide.

The metal oxide powder may comprise, or consist essentially of, a metal (III) oxide powder ($M_2O_3$, where M is a metal). For instance, the metal oxide powder may comprise, or consist essentially of, vanadium (III) oxide ($V_2O_3$).

The metal, M, may comprise vanadium, molybdenum, tungsten, germanium or manganese. Accordingly, the metal complex may be a vanadium complex, a molybdenum complex, a tungsten complex, a germanium complex or a manganese complex. For instance, the metal complex may be a vanadium (III) complex, a vanadium (IV) complex, a molybdenum (IV) complex, a molybdenum (VI) complex, a molybdenum (VIII) complex, a tungsten (IV) complex, a germanium (IV) complex or a manganese (IV) complex.

The metal complex may comprise one or more ligands. The ligand(s) may comprise a diketonate such as acetylacetonate (acac). The ligand(s) may comprise oxalate (ox). Other suitable ligands may include simple carboxylic acids, amino acids, alpha-hydroxy carboxylic acids, citrates, beta-keto esters and beta-keto iminates.

Selecting a given ligand can affect the purity of the metal oxide powder produced by the process. The structure of the ligand is crucial to determining the temperature of decomposition of the metal complex and consequently the purity of the metal oxide powder product.

Advantageously, the process may produce metal oxide powder, e.g. vanadium (IV) oxide powder, in a pure form (e.g. with a purity of 90% or more).

In an embodiment, the oxidation state of the metal may not be the same in the metal complex as it is in the metal oxide powder.

In some embodiments, importantly, the metal does not change oxidation state during the spray pyrolysis process, i.e. it exists in the same oxidation state in the precursor complex as in the final powder product. Without wishing to be bound by any theory, it is thought that this results in the metal oxide powder produced in accordance with the invention being of very good purity (i.e. at least 90% pure).

The vanadium complex, e.g. the vanadium (IV) complex, may comprise a vanadyl ion ($VO^{2+}$) and one or more ligands. Vanadyl acetylacetonate [$VO(acac)_2$] may be a suitable vanadium (IV) complex. Vanadyl oxalate [$VO(ox)$], e.g. [$VO(ox)(H_2O)_2$] or [$VO(ox)_2$]$^{2-}$, may be a suitable vanadium (IV) complex.

Advantageously, vanadyl acetylacetonate is sufficiently water soluble for use in the process of the invention. However, a more water soluble vanadium complex, e.g. vanadium (IV) complex, may be more preferable.

Advantageously, vanadyl oxalate has better solubility in water. Another benefit of vanadyl oxalate is that the precursor materials, e.g. oxalic acid, typically may be relatively inexpensive. In addition, $VO_2$ powders produced using vanadyl oxalate as the vanadium (IV) complex have been found typically to be cleaner than $VO_2$ powders produced using vanadyl acetylacetonate as the vanadium (IV) complex.

The molybdenum complex may comprise a molybdenyl ion ($MoO_2^{2+}$) and one or more ligands. Molybdenyl acetylacetonate [$MoO_2(acac)_2$], a molybdenum (VI) complex, may be a suitable molybdenum complex. Molybdenyl oxalate [$MoO_2(ox)_2$], a molybdenum (VIII) complex, may be a suitable molybdenum complex. A molybdenum (IV) complex comprising suitable ligands may be a suitable molybdenum complex.

Advantageously, use of a water-soluble metal complex or other precursors may be preferred, since it may then be safer and easier to practise the invention.

In an embodiment, the precursor solution may comprise a solution of the metal complex, e.g. vanadium complex or molybdenum complex, in an aqueous solvent mixture. The aqueous solvent mixture may comprise an alcohol, e.g. ethanol, and water. In addition, the precursor solution may further comprise an acid, e.g. acetic acid. Additionally or alternatively, the precursor solution may comprise a ketone such as acetone.

In an embodiment, the precursor solution may comprise 0.228 M vanadyl acetylacetonate [$VO(acac)_2$] in a 2:1 by volume mixture of ethanol to 7% by volume acetic acid in water.

In an embodiment, the precursor solution may comprise vanadyl oxalate [$VO(ox)$]. The precursor solution may be an aqueous solution. The precursor solution may comprise acetone.

In an embodiment, the precursor solution may comprise one or more further metals, e.g. zinc, chromium, aluminium, niobium, molybdenum (when not producing a molybdenum oxide) and/or tungsten (when not producing a tungsten oxide), as dopants. Accordingly, the metal oxide powder, e.g. vanadium (IV) oxide powder, produced by the process may comprise, or consist essentially of, undoped metal oxide or doped metal oxide.

A precursor solution containing the dopant(s) may be supplied to a nozzle and sprayed on to the heated substrate. Alternatively or additionally, the dopant(s) may be supplied to a nozzle separately from the precursor solution or dispersion containing the metal complex; the dopant(s) may then be mixed with the precursor solution or dispersion containing the metal complex at the nozzle immediately before spraying. Alternatively or additionally, one or more solutions or dispersions containing the dopant(s) may be sprayed from one or more different nozzles from the precursor solution or dispersion containing the metal complex, such that the solutions or dispersions mix together as they are sprayed on to the substrate.

The amount of the dopant(s) may be varied during spraying of the precursor solution on to the heated substrate. By controlling the flow rate of a suspension or dispersion containing the dopant(s) to the nozzle(s) relative to the flow rate of the precursor solution or dispersion containing the metal complex, the amount of the dopant(s) may be varied without stopping the spraying of the precursor solution on to the heated substrate.

Suitable precursor materials for the dopant(s) may include water-soluble metal salts, e.g. a water-soluble zinc, chromium, aluminium, niobium, molybdenum (when not producing a molybdenum oxide) and/or tungsten (when not producing a tungsten oxide) salt.

In an embodiment, the precursor solution or dispersion may be sprayed on to the heated substrate in a controlled and/or a protective and/or an inert atmosphere, e.g. nitrogen. Typically, the precursor solution may be sprayed on to the heated substrate in an atmosphere other than air.

In an embodiment, the precursor solution or dispersion may be sprayed on to the heated substrate with the aid of a carrier gas. Typically, the carrier gas may be non-reactive; for instance, the carrier gas may comprise, or consist essentially of, nitrogen.

In an embodiment, the precursor solution or dispersion may be sprayed on to the heated substrate in a humid atmosphere. For example, the humid atmosphere may be provided by a water-containing (e.g. water-saturated) carrier gas, e.g. water-saturated nitrogen, and/or water in the precursor solution.

In an embodiment, the precursor solution or dispersion may be sprayed on to the heated substrate at a rate of up to 5 ml/min. The precursor solution may be sprayed on to the heated substrate at a rate of at least 0.2 ml/min. For example, the precursor solution or dispersion may be sprayed on to the heated substrate at a rate of at least 0.5 ml/min and/or up to 3 ml/min. The precursor solution or dispersion may be sprayed on to the heated substrate at a rate of 1 ml/min.

In an embodiment, the carrier gas may be sprayed at a rate of at least 4 ml/min and/or up to 60 ml/min. The carrier gas may be sprayed at a rate of up to or at least 7 ml/min and/or up to or at least 15 ml/min.

The rate at which the precursor solution or dispersion is sprayed and/or the rate at which the carrier gas is sprayed may be substantially constant or may be varied.

In an embodiment, the substrate may be heated to a temperature of at least 300° C., at least 400° C., at least 450° C. and/or up to 550° C. The substrate may be heated to a temperature of at least 460° C. and/or up to 530° C. For instance, the substrate may be heated to a temperature of approximately 460° C., 490° C. or 530° C.

During spraying of the precursor solution, the substrate may be held at a substantially constant temperature or the temperature of the substrate may be varied.

In an embodiment, the process may comprise the step of, before spraying the precursor solution, heating the substrate. The substrate may be heated at a rate of up to or at least 30° C./min.

In an embodiment, drying the deposited material may be carried out in a controlled and/or a protective and/or an inert atmosphere, e.g. nitrogen.

Carrying out the spraying, and typically the drying, steps in an inert atmosphere may be beneficial, in that it may prevent the generation of higher oxidation states. Thus, for example, high quality vanadium (IV) oxide films can be formed in accordance with the present invention. In contrast, in prior art processes carried out in air, typically higher, e.g. the highest possible, oxidation states will be formed.

In an embodiment, drying the deposited material may comprise maintaining the substrate at a predetermined drying temperature for a predetermined drying time.

The predetermined drying temperature may be substantially constant or may vary during the drying of the deposited material.

Conveniently, the predetermined drying temperature may be the same as the temperature to which the substrate is heated during spraying of the precursor solution on to the heated substrate. For instance, the predetermined drying temperature may be at least 300° C., at least 400° C., at least 450° C. and/or up to 550° C. The predetermined drying temperature may be at least 460° C. and/or up to 530° C. For instance, the predetermined drying temperature may be approximately 460° C., 490° C. or 530° C.

The predetermined drying time may be at least 5 minutes and/or up to 60 minutes. The predetermined drying time may be approximately 30 minutes or approximately 40 minutes.

In an embodiment, the method may comprise heat treating, e.g. annealing, the deposited material. For instance, the heat treatment, e.g. annealing, may be carried out at a predetermined annealing temperature for a predetermined annealing time. The heat treatment, e.g. annealing, may be carried out in an inert atmosphere, e.g. a nitrogen atmosphere.

Conveniently, the predetermined annealing temperature may be the same as, or similar to, the temperature to which the substrate is heated during spraying of the precursor solution on to the heated substrate. For instance, the predetermined annealing temperature may be at least 300° C., at least 400° C., at least 450° C. and/or up to 550° C.

The predetermined annealing temperature may be at least 460° C. and/or up to 530° C. For instance, the predetermined annealing temperature may be approximately 460° C., 490° C., 525° C. or 530° C.

The predetermined annealing time may be up to or at least 60 minutes, up to or at least two hours or up to or at least 3 hours. For instance, the predetermined annealing time time may be approximately three hours.

In an embodiment, the steps of spraying the precursor solution on to a heated substrate in the presence of water, thereby depositing material on the substrate and drying the deposited material may be repeated one or more times, e.g. at regular intervals. For instance, the step of spraying the precursor solution on to a heated substrate in the presence of water, thereby depositing material on the substrate may be repeated at intervals of up to or at least 5 minutes, up to or at least 10 minutes, up to or at least 15 minutes, up to or at least 20 minutes, and/or up to or at least 30 minutes.

In an embodiment, the process may comprise the step of, after drying (for the last time), cooling the deposited material on the substrate. The deposited material on the substrate may be cooled in a controlled and/or a protective and/or an inert atmosphere, e.g. nitrogen.

The deposited material on the substrate may be cooled at a controlled cooling rate.

The controlled cooling rate may be substantially constant or may vary during the cooling of the deposited material on the substrate.

Typically, the controlled cooling rate may be relatively rapid. The controlled cooling rate may be at least 10° C./min or at least 15° C./min. For instance, the controlled cooling rate may be approximately 15° C./min, approximately 25° C./min or approximately 40° C./min.

It has been found that pH has an effect on the performance of the process. Accordingly, the process may work particularly well when the pH is controlled such that it is within a preferred operating pH range. The preferred operating pH range will depend on the choice of precursor solution and/or complex and/or other operating conditions, e.g. temperature. Generally, if the pH is too alkaline, then unwanted precipitates may form; if the pH is too acidic, then the metal oxide may not form on the substrate. Typically, the preferred pH operating range may be between 5 and 9. In an embodiment, the pH of the precursor solution may be at least 5 and/or up to 9. The pH of the precursor solution may be at least 5.5 or at least 6. The pH of the precursor solution may be up to 8.5 or up to 8.

In an embodiment, the material deposited on the substrate may be removed from the substrate by any suitable non-chemical, non-thermal means such as by scraping the deposited material from the substrate and/or by tipping (e.g. inverting) the substrate and/or shaking the substrate.

Following the step of removing the deposited material from the substrate, the process may be repeated any number of times. The substrate may be re-used.

In an embodiment, the process may comprise a step of further processing the deposited material removed from the substrate to provide the metal oxide powder, e.g. vanadium (IV) oxide powder or molybdenum (IV) oxide powder, with one or more desired characteristics, e.g. a higher purity and/or a particular particle size distribution.

In an embodiment, the process may comprise a step of preparing the precursor solution. The precursor solution may be prepared 48 hours or less before being sprayed on to the heated substrate.

In an embodiment, the precursor solution may be prepared by dissolving $V_2O_5$ and oxalic acid in water. The precursor solution may be warmed to facilitate dissolution of the $V_2O_5$ and oxalic acid. The precursor solution may include acetone.

In an embodiment, the substrate may comprise, or consist essentially of, a glass, e.g. a silicate glass such as soda-lime glass. The substrate may be made at least partially from materials other than glasses, e.g. non-vitreous materials.

The substrate may be of any suitable size and/or shape. For instance, the substrate may or may not be flat.

The substrate may be stationary or moving, e.g. while the precursor solution is being sprayed on to the substrate. For instance, the substrate may move relative to a coating apparatus comprising one or more nozzle(s) operable to spray the precursor solution on to the substrate.

In another aspect, the invention provides a powder comprising or consisting essentially of a metal oxide powder obtained or obtainable by the process of the first aspect of the invention.

In another aspect, the invention provides the use of a powder comprising or consisting essentially of a metal oxide powder obtained or obtainable by the process of the first aspect of the invention.

The use of the powder may include use in a coating, paint or ink.

In order that the invention may be well understood, it will now be described with reference to the accompanying drawings, in which.

Figure 1:
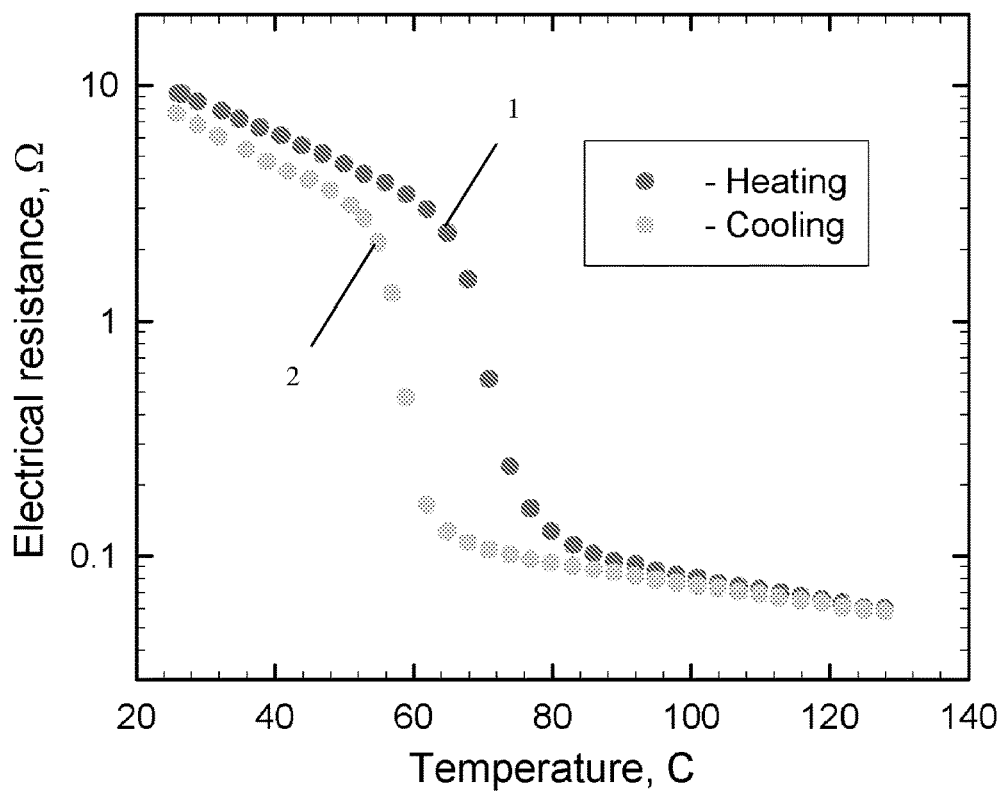
FIG. 1 shows the typical variation of electrical resistance with temperature for $VO_2$ deposited as a film.

FIG. 1 shows the typical variation of electrical resistance with temperature for $VO_2$ deposited as a film. As can be seen in FIG. 1, there is a step-change in electrical resistance at around 60° C. to 70° C. The step-change in electrical resistance is approximately two orders of magnitude. This change in electrical resistance is a consequence of the semiconductor-to-metal transition. As can be seen in FIG. 1, the typical variation of electrical resistance with temperature for $VO_2$ deposited as a film has a hysteresis of around 15° C. in width. In FIG. 1, one of a series of data points for heating is labelled 1 and one of a series of data points for cooling is labelled 2.

Figure 2:
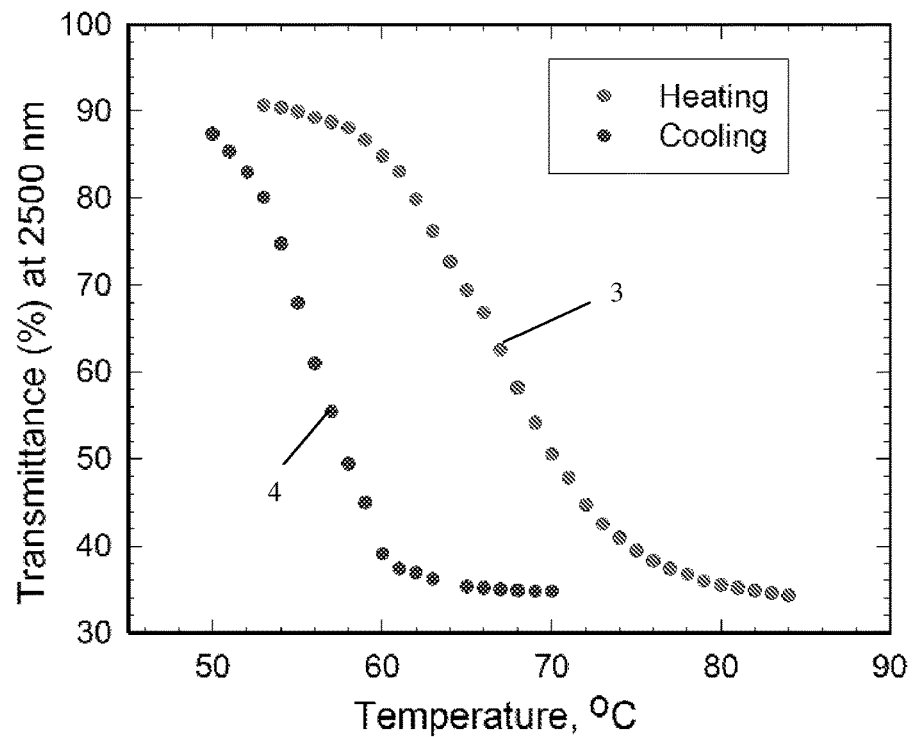
FIG. 2 shows the typical variation of optical transmittance of $VO_2$ deposited as a film at 2500 nm as a function of temperature.

FIG. 2 shows the typical variation of optical transmittance of $VO_2$ deposited as a film at 2500 nm wavelength as a function of temperature. As can be seen in FIG. 2, there is a significant change in optical transmittance at around 60° C. to 70° C. This change in optical transmittance is a consequence of the semiconductor-to-metal transition. At temperatures above the transition, the optical transmittance of $VO_2$ deposited as a film at 2500 nm is between 30% and 40%; at temperatures below the transition, the optical transmittance of the $VO_2$ at 2500 nm is around 90%. As can be seen in FIG. 2, the typical variation of optical transmittance of $VO_2$ deposited as a film at 2500 nm as a function of temperature has a hysteresis of around 15° C. in width. In FIG. 2, one of a series of data points for heating is labelled 3 and one of a series of data points for cooling is labelled 4.

Thus, the optical transmittance of $VO_2$ deposited as a film changes significantly, due to the semiconductor-to-metal transition. At temperatures below the transition, $VO_2$ is substantially transparent. At temperatures above the transition, $VO_2$ is significantly less transparent (more opaque). In $VO_2$, the semiconductor-to-metal transition occurs at around 70° C. This is not that much higher than the temperatures that can be reached on hot days in some parts of the world. It is this change in optical properties and the temperature at which the change occurs, which makes the use of doped or undoped $VO_2$ of particular interest in the manufacture of smart windows.

In accordance with the invention, spray pyrolysis can be used to deposit $VO_2$ as a film on a substrate. The film can then be removed from the substrate, in order to provide a $VO_2$ powder.

Several experiments were conducted, in order to determine suitable conditions for reliably producing $VO_2$ films by spray pyrolysis.

Generally, the process involves providing a precursor solution containing a vanadium (IV) complex. The precursor solution is then sprayed in the presence of water on to a heated substrate, thereby depositing material on the substrate. After spraying, the deposited material is dried by maintaining the substrate at a predetermined drying temperature for a predetermined drying time. After drying, the deposited material on the substrate is cooled to ambient temperature at a controlled, relatively quick, rate. The deposited material can then be removed from the substrate to produce a vanadium (IV) oxide powder.

X-ray diffraction (XRD) data from $VO_2$ deposited as films successfully produced by spray pyrolysis in accordance with the invention indicate two main phases: $V_3O_5$ (an oxygen-deficient semiconducting phase and $VO_2$ in its low-temperature M1 monoclinic form. Typically, there is a peak in the XRD spectra at 9° and peaks at 30°. The peak at 9° is associated with $V_3O_5$; the peaks at 30° are associated with $V_3O_5$ and $VO_2$. In some instances, the peak at 9° was more intense than the peaks at 30°; in other instances, the peaks at 30° were stronger.

Table 1 below shows spray pyrolysis conditions that were found by the applicant to produce good quality $VO_2$ (A-K), which was deposited as a film on a glass substrate. The $VO_2$ was around 300 nm thick.

TABLE 1

| Film | Substrate temp. (° C.) | Carrier gas | Cooling rate (° C./min) | Drying time (mins) | Precursor complex | Precursor solution conc. (M) | Carrier gas flow rate (ml/min) | Precursor solution spray rate (ml/min) |
|---|---|---|---|---|---|---|---|---|
| A | 530 | $N_2$ | 15 | 60 | [VO(acac)$_2$] | 0.05 | 7 | 0.5 |
| B | 530 | $N_2$ | 15 | 60 | [VO(acac)$_2$] | 0.0228 | 15 | 1 |
| C | 530 | $N_2$ | 15 | 45 | [VO(acac)$_2$] | 0.0228 | 15 | 1 |
| D | 530 | $N_2$ | 15 | 60 | [VO(acac)$_2$] | 0.0228 | 15 | 1 |

TABLE 1-continued

| Film | Substrate temp. (° C.) | Carrier gas | Cooling rate (° C./min) | Drying time (mins) | Precursor complex | Precursor solution conc. (M) | Carrier gas flow rate (ml/min) | Precursor solution spray rate (ml/min) |
|---|---|---|---|---|---|---|---|---|
| E | 530 | $N_2$ | 15 | 5 | [VO(acac)$_2$] | 0.0228 | 15 | 1 |
| F | 530 | $N_2$ | 15 | 30 | [VO(acac)$_2$] | 0.0228 | 15 | 1 |
| G | 530 | $N_2$ | 15 | 30 | [VO(acac)$_2$] | 0.0228 | 15 | 1 |
| H | 530 | $N_2$ | 40 | 30 | [VO(acac)$_2$] | 0.0228 | 15 | 1 |
| I | 465 | $N_2$ | 15 | 30 | [VO(acac)$_2$] | 0.0228 | 15 | 1 |
| J | 490 | $N_2$ | 15 | 30 | [VO(acac)$_2$] | 0.0228 | 15 | 1 |
| K | 530 | $N_2$ | 15 | 30 | [VO(acac)$_2$], with 2 mol % [Zn(acac)$_2$ · H$_2$O] | 0.0228 | 15 | 1 |

The spray pyrolysis conditions and parameters used to produce film A successfully produced a uniform film. A hysteresis typical of the semiconductor-to-metal transition in $VO_2$ was seen in measurements of the variation of electrical resistance with temperature for film A.

In producing film B, the effects of carrier gas flow rate, precursor solution spray rate and precursor solution concentration on the reliability of film production were tested. A hysteresis typical of the semiconductor-to-metal transition in $VO_2$ was seen in measurements of the variation of electrical resistance with temperature for film B.

Film C was produced using the same conditions and parameters as film B, except that the drying time was shorter (45 minutes instead of 60 minutes). A hysteresis typical of the semiconductor-to-metal transition in $VO_2$ was seen in measurements of the variation of electrical resistance with temperature for film C.

Figure 3:
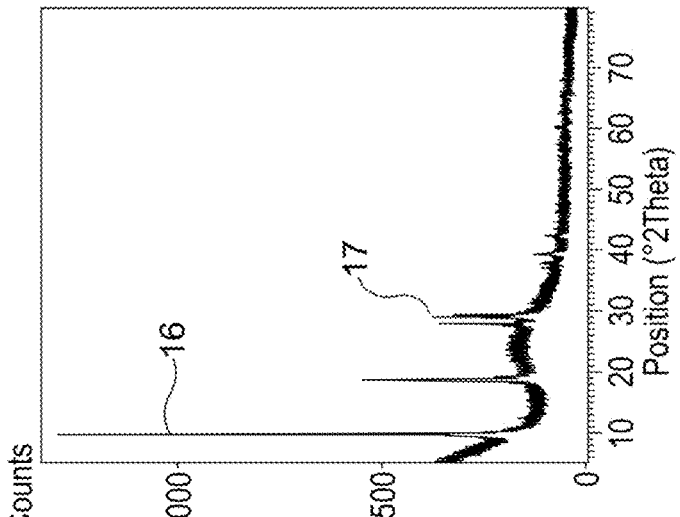
FIG. 3 is a scanning electron microscope (SEM) image of $VO_2$ deposited as a film in accordance with the invention.

FIG. 3 is a scanning electron microscope (SEM) image of film D. The image was taken using an accelerating voltage of 5 kV and at a working distance of 10 mm. The magnification of the SEM image is 50000 times.

Figure 4:
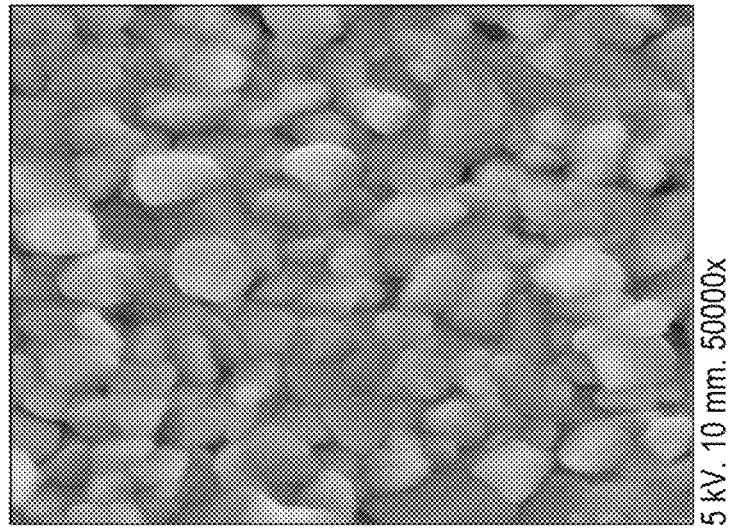
FIG. 4 shows the variation of electrical resistance with temperature for $VO_2$ deposited as a film shown in FIG. 3.

FIG. 4 shows the variation of electrical resistance with temperature for film D. A hysteresis typical of the semiconductor-to-metal transition in $VO_2$ can be seen. An arrow labelled 14 indicates heating; an arrow labelled 15 indicates cooling.

Figure 5:
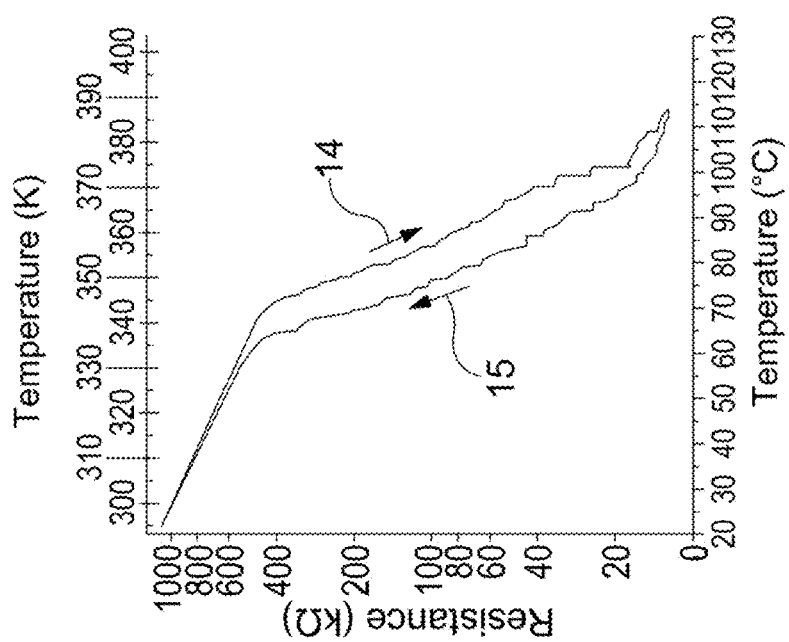
FIG. 5 is an x-ray diffraction (XRD) spectrum for $VO_2$ deposited as a film shown in FIG. 3.

FIG. 5 is an x-ray diffraction (XRD) spectrum of film D. The spectrum contains a prominent peak 16 at around 9° and smaller, significant peaks 17 at around 30°.

Film D was produced under the same spray pyrolysis conditions as film B. This was done to test the reproducibility of the process used to produce film B. The successful production of film D indicated that the process used to produce film B was reproducible.

Film E appeared to be a normal-looking $VO_2$ film produced in accordance with the invention. In producing the film E, a very short drying time was used (5 minutes). No significant hysteresis loop was seen in measurements of the variation of electrical resistance with temperature for film E. Without wishing to be bound by any theory, the absence of a significant hysteresis loop for film E could be a consequence of the very short drying time used in producing the film E. The other spray pyrolysis conditions used in the production of film E were the same as were used in the production of films B and D, both of which exhibited an observable, significant hysteresis loop in the variation of electrical resistance with temperature.

A hysteresis typical of the semiconductor-to-metal transition in $VO_2$ was seen in measurements of the variation of electrical resistance with temperature for film F and film G.

Films F and G were produced using the same spray pyrolysis process conditions. This suggests that the practising the process using these process conditions produces reproducible results in terms of film production.

The process for producing film H was successful in that it produced a good $VO_2$ film. The process conditions included a relatively fast cooling rate of 40° C./min. A hysteresis typical of the semiconductor-to-metal transition in $VO_2$ was seen in measurements of the variation of electrical resistance with temperature for film H.

The processes by which films I and J were produced were both successful. In producing film I, the substrate temperature was 465° C.; in producing film J, the substrate temperature was 490° C. A hysteresis typical of the semiconductor-to-metal transition in $VO_2$ was seen in measurements of the variation of electrical resistance with temperature for film I and film J.

In the production of film K, zinc was introduced as a dopant. Consequently, film K was a zinc-doped $VO_2$ film. The film exhibited a good change in resistance with temperature associated with the semiconductor-to-metal transition. The width of the observed hysteresis loop was relatively narrow.

Example of a Preferred Process

The experimental data were analysed, in order to derive a preferred method and set of process conditions for reliably producing good $VO_2$ powders by spray pyrolysis in accordance with the invention.

A precursor solution is prepared by dissolving approximately 0.228 M vanadyl acetylacetonate ([VO(acac)$_2$]) in a 2:1 by volume mixture of ethanol to 7% by volume acetic acid in water. Preferably, the precursor solution may be prepared not more than 48 hours prior to use.

The precursor solution is then deposited on to a substrate by spray pyrolysis in a humid atmosphere.

In this preferred example process, the carrier gas is pure nitrogen, which is supplied to the nozzle of the spray pyrolysis system at a flow rate of 14.5 l/minute. Alternatively, the carrier gas may be water-saturated nitrogen. At the same time, the precursor solution is introduced into the nozzle at a flow rate of 1 ml/min. Droplets of the precursor solution are thereby produced at the nozzle, and carried to the substrate and deposited thereon.

A glass substrate is used, which is held at a temperature of 490° C. during spray deposition. The duration of the spray deposition process is approximately 40 minutes.

Following the spray deposition process, the deposited material and the substrate are held at 490° C. for a further 30 minutes. The deposited material forms a film on the substrate. Typically, the film has a thickness of approximately 300 nm.

The person skilled in the art will appreciate that the process conditions used to produce the films A-K and of the preferred process may be varied without departing from the scope of the invention.

After cooling, the material deposited on the substrate is removed from the substrate, thereby providing a metal oxide powder, e.g. $VO_2$ powder. The material deposited on the substrate may be removed from the substrate by any suitable non-chemical, non-thermal means such as by scraping the deposited material from the substrate and/or by tipping (e.g. inverting) the substrate and/or shaking the substrate.

The deposited material removed from the substrate may be further processed to provide the metal oxide powder, e.g. vanadium (IV) oxide powder, with one or more desired characteristics, e.g. a higher purity and/or a particular particle size distribution.

In another example embodiment of the invention, vanadium (IV) oxide was deposited as a film by spray pyrolysis using vanadium (V) oxide ($V_2O_5$) as a precursor. 0.236 g $V_2O_5$ and 0.6 g oxalic acid solid precursors were dissolved in 25 ml of water and warmed until a blue vanadyl oxalate ([VO(ox)]) solution was formed. 15 ml of the [VO(ox)] solution was sprayed, with nitrogen as a carrier gas, at a rate of 0.5 ml/min on to a glass substrate held at 500° C. The deposited film was then annealed at 525° C. under flowing nitrogen for three hours. Optionally, acetone may be added to the [VO(ox)] solution.

Figure 6:
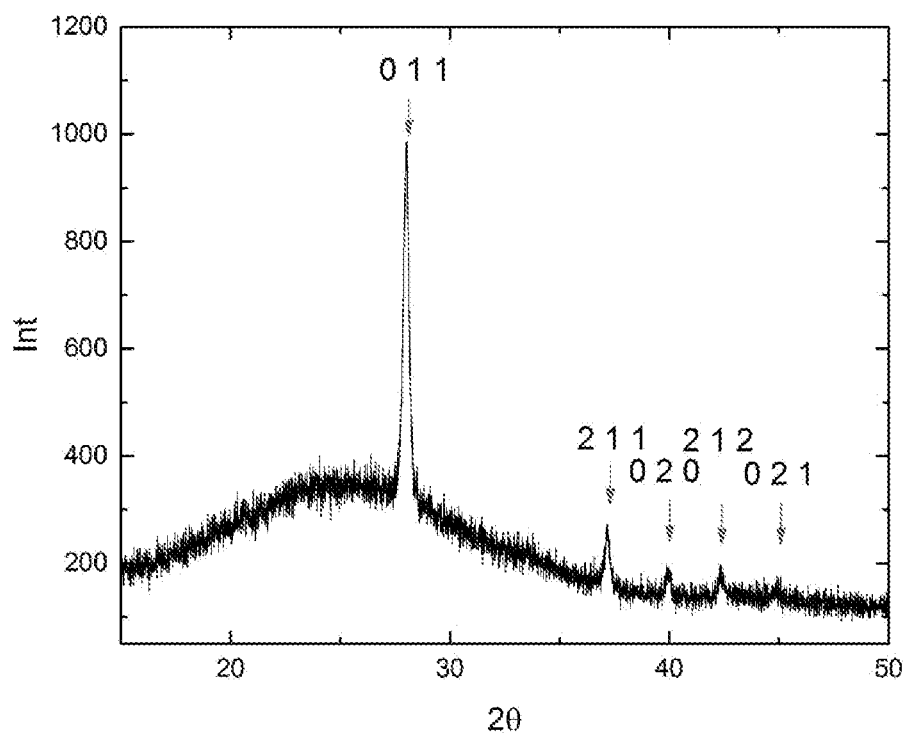
FIG. 6 is an XRD spectrum for another example embodiment of $VO_2$ deposited as a film in accordance with the invention.

The $VO_2$ film produced was uneven and powdery. FIG. 6 is an XRD spectrum of the $VO_2$ film. Peaks corresponding to the (011), (211), (020), (212) and (021) planes are labelled in FIG. 6.

After cooling, the material deposited on the substrate was removed from the substrate by a suitable non-chemical, non-thermal method, thereby producing a $VO_2$ powder.

In another example embodiment of the invention, vanadium (IV) oxide was deposited as a film by spray pyrolysis using vanadium (V) oxide ($V_2O_5$) as a precursor.

0.103 g $V_2O_5$ and 0.2 g oxalic acid solid precursors were dissolved in 10 ml of water and warmed until a blue vanadyl oxalate ([VO(ox)]) solution was formed. The [VO(ox)] solution was sprayed, with nitrogen as a carrier gas, at a rate of 1.0 ml/min on to a glass substrate held at 450° C. The deposited film was then annealed at 525° C. under flowing nitrogen for three hours. Optionally, acetone may be added to the [VO(ox)] solution.

Figure 7:
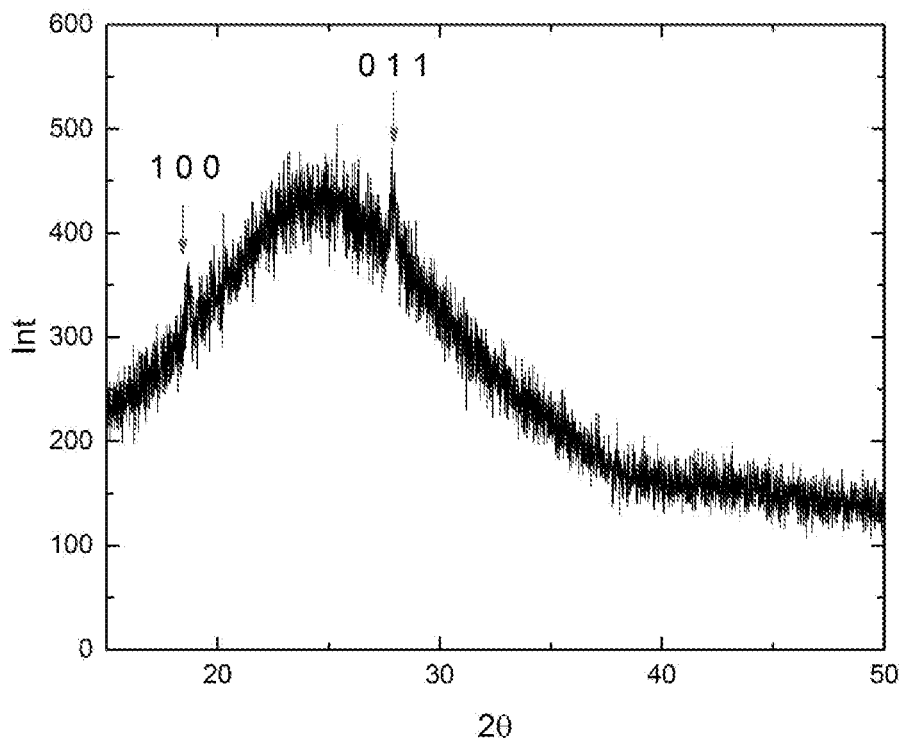
FIG. 7 is an XRD spectrum for another example embodiment of $VO_2$ deposited as a film in accordance with the invention.

The $VO_2$ film produced was relatively uniform and thin. FIG. 7 is an XRD spectrum of the $VO_2$ film. Peaks corresponding to the (100) and (011) are labelled in FIG. 7.

After cooling, the material deposited on the substrate was removed from the substrate by a suitable non-chemical, non-thermal method, thereby producing a $VO_2$ powder.

Methods using an oxalate precursor, e.g. oxalic acid, may be preferred, since oxalate precursor materials generally may be relatively cheap. In addition, the powder products formed by methods using an oxalate precursor may be relatively clean.

There are two vanadyl oxalates, [VO(ox)($H_2O)_2$] and [VO(ox)$_2$]$^{2-}$. When the vanadium (IV) oxalate is produced by dissolving $V_2O_5$ in an excess of an oxalate solution, more of the dianionic complex ([VO(ox)$_2$]$^{2-}$) than the neutral complex ([VO(ox)($H_2O)_2$]) typically may be present.

In embodiments of the invention, dopants may be added to the solution, in order to modify the powder produced. Suitable dopant precursor materials may include water-soluble metal salts, e.g. a water-soluble tungsten salt.

Metal oxide powders, e.g. vanadium (IV) oxide powders, obtained or obtainable by the production process of the invention may have utility in a wide range of applications. For instance, powders obtained or obtainable by the process of the invention may be used in thermochromic coatings, inks or paints. Such powders may, for example, be used in the coating of glass to produce thermochromic windows ("smart" windows) for buildings or vehicles. Such coatings may also be applied to objects, in order to reduce the thermal (infrared) images of the objects.

The production process of the present invention has several advantages over known methods of producing metal oxide powders, e.g. vanadium (IV) oxide powder.

Importantly, in some embodiments, the metal, e.g. vanadium, generally may not change oxidation state during the spray pyrolysis process, i.e. the metal exists in the same oxidation state in the precursor complex as in the final powder product. Without wishing to be bound by any theory, it is thought that this results in the metal oxide powder, e.g. vanadium (IV) oxide powder, produced in accordance with the invention being of very good purity (i.e. at least 90% pure).

The coordination and decomposition chemistry of precursor vanadyl complexes means that the spray pyrolytic process of the invention is successful. The complexes decompose, i.e. the ligands become separated from the vanadyl ions, due to the temperature of the substrate. The water provides the oxygen that is required to react with the vanadyl ion to produce vanadium (IV) oxide ($VO_2$). Preferably, the water may be the principal, e.g. only, source of oxygen available for the reaction. The water may be provided by an aqueous solution (e.g. an aqueous precursor solution) and/or an aqueous solvent mixture and/or a water-containing (e.g. water-saturated) carrier gas.

While knowledge of the coordination and decomposition chemistry of targeted precursors (e.g. the coordination and decomposition chemistry of targeted vanadyl precursors such as [VO(acac)$_2$] and [VO(ox)]) underpins this invention, in further developing the invention the spray pyrolytic process has been tested, controlled, developed and optimised.

For example, the process allows for the production of metal oxide, e.g. vanadium (IV) oxide, at lower temperatures than flame spray pyrolysis. Also, the process may be more acceptable from an environmental and/or health and safety perspective than processes such as APCVD. One environmental benefit is that the process may provide the ability to produce metal oxide powders, e.g. vanadium (IV) oxide powders, from an aqueous precursor solution.

Furthermore, careful selection of the precursor complex can reduce or minimise any harmful emissions (e.g. nitrous oxide) when the precursor complex decomposes. For example, the acetylacetonate (acac) ligand has reasonable water solubility and does not produce very harmful emissions on decomposition of the precursor complex, making it a suitable choice for use in the present invention. The oxalate (ox) ligand has good water solubility and also does not produce very harmful emissions on decomposition of the precursor complex, making it a suitable choice for use in the present invention.

Advantageously, the process can be scaled up to produce relatively large quantities of very pure doped or undoped powder.

As a result of the use of aqueous solutions, relatively low temperatures and/or low-harmful emission ligands, the equipment cost and complexity for practising the invention may be relatively low. Thus, it may be relatively economical to scale-up the invention. Furthermore, since the ligand(s) may remain intact after decomposition of the precursor complex, in some embodiments, it may be possible to recover the ligand(s) and subsequently re-use the recovered ligand(s) in the preparation of the precursor complex. Thus, the ligand(s) may be recyclable, thereby further reducing or minimising the cost of practising the invention.

While the invention has been described specifically in relation to the production of vanadium (IV) oxide powders, it will be appreciated that other metal (IV) oxide powders may be produced by the process of the invention. For instance, the spray pyrolytic process of the invention may be used to produce doped or undoped molybdenum (IV) oxide powder, tungsten (IV) oxide powder, germanium (IV) oxide powder or manganese (IV) oxide powder.

In addition, the process may be utilised to produce metal oxide powders, in which the metal has other oxidation states. For instance, the process may be utilised to produce metal (II) oxide powders or metal (III) oxide powders such as vanadium (III) oxide powder.

It will be appreciated that the methods of the invention are typically performed in an inert atmosphere and generate intermediate oxidation states. By performing the methods in an inert atmosphere, advantageously the formation of higher, e.g. highest, oxidation states is avoided.

The invention claimed is:

1. A process for producing a metal oxide powder comprising of one of a metal (IV) oxide powder ($MO_2$ where M is a metal) and a metal oxide powder comprising of a metal (III) oxide film ($M_2O_3$ where M is a metal),
   the process comprising:
   providing one of a precursor solution and a dispersion containing a metal (IV) complex or a metal (III) complex;
   spraying the precursor solution or dispersion on to a heated substrate in the presence of water, thereby depositing material on the substrate;
   drying the deposited material;
   cooling the deposited material on the substrate at a controlled cooling rate of at least 10° C./min; and
   removing the deposited material from the substrate to produce the metal oxide powder,
   wherein:
   the metal (M) is vanadium, molybdenum, tungsten, germanium or manganese; and
   the spraying, drying and cooling steps are carried out in at least one of a protective or inert atmosphere.

2. A process according to claim 1, wherein the precursor solution or the dispersion is selected from: an aqueous solution; the concentration of the precursor solution or dispersion is up to 0.1M; and the concentration of the metal (IV) complex or the metal (III) complex in the precursor solution is up to 0.1M.

3. A process according to claim 1, wherein the metal is selected from one of:
   (i) the metal is vanadium and the metal complex is vanadyl acetylacetonate;
   (ii) the metal is vanadium and the metal complex is vanadyl oxalate;
   (iii) the metal is molybdenum and the metal complex is molybdenyl acetylacetonate; and
   (iv) the metal is molybdenum and the metal complex is molybdenyl oxalate or a suitable molybdenum (IV) complex.

4. A process according to claim 1, wherein the oxidation state of the metal is the same in the metal complex as it is in the metal oxide powder.

5. A process according to claim 1, wherein the precursor solution or dispersion comprises one or more further metals as dopants.

6. A process according claim 1, wherein the precursor solution or dispersion is sprayed on to the heated substrate with the aid of a carrier gas optionally wherein the carrier gas is sprayed at a rate of up to 60 ml/min.

7. A process according to claim 1, wherein the precursor solution or dispersion is sprayed on to the heated substrate at a rate of up to 5 ml/min.

8. A process according to claim 1, wherein the substrate is heated to a temperature selected from one of:
   (i) at least 300° C.;
   (ii) at least 400° C.;
   (iii) at least 450° C.; and
   (iv) up to 550° C.

9. A process according to claim 1, wherein drying the deposited material comprises the steps of maintaining the substrate at a predetermined drying temperature for a predetermined drying time, wherein the predetermined drying temperature is selected from one of:
   (i) at least 300° C.;
   (ii) at least 400° C.;
   (iii) at least 450° C.; and
   (iv) up to 550° C.; and wherein the predetermined drying time is selected from:
      (a) at least 5 minutes; and
      (b) up to 60 minutes.

10. A process according to claim 1 comprising one of heat treating, and annealing, the deposited material, wherein the heat treating is carried out in one of the protective or inert atmosphere.

11. A process according to claim 1, wherein the steps of spraying the precursor solution or dispersion on to a heated substrate in the presence of water, thereby depositing material on the substrate and drying the deposited material are repeated one or more times.

12. A process according to claim 1, wherein the precursor solution has a pH which is selected from one of: at least 5 and up to 9.

13. A process according to claim 1, wherein the deposited material is removed from the substrate by any suitable non-chemical, non-thermal means selected from the group consisting of scraping the deposited material from the substrate, tipping the substrate, inverting the substrate, and shaking the substrate.

14. A process according to claim 1, wherein the process comprises a step of further processing the deposited material removed from the substrate.

15. A process according to claim 1, wherein the substrate comprises a glass.

16. A process according to claim 1, wherein the precursor solution containing the dopant(s) is one of:
   supplied to a nozzle and sprayed on to the heated substrate;
   the dopant(s) is/are supplied to a nozzle separately from the precursor solution or dispersion containing the metal complex and the dopant(s) is/are mixed with the precursor solution or dispersion containing the metal complex at the nozzle immediately before spraying; or
   one or more solutions or dispersions containing the dopant(s) is/are sprayed from one or more different nozzles from the precursor solution or dispersion containing the metal complex, such that the solutions or dispersions mix together as they are sprayed on to the substrate.

17. A process according to claim 1, wherein the method comprises a step of preparing the precursor solution.

\* \* \* \* \*